United States Patent [19]
Nazarian et al.

[11] Patent Number: 5,564,420
[45] Date of Patent: Oct. 15, 1996

[54] MEDICAL DEVICE WITH EMI DETECTION AND CANCELLATION

[75] Inventors: Richard A. Nazarian, Golden Valley, Minn.; Charles N. Peteros, Carlsbad, Calif.

[73] Assignees: Minnesota Mining and Manufacturing Company, St. Paul, Minn.; Viasat, Inc., Carlsbad, Calif.

[21] Appl. No.: 422,152

[22] Filed: Apr. 14, 1995

[51] Int. Cl.$^6$ .................................. A61B 5/05; A61B 8/06
[52] U.S. Cl. ...................... 128/653.1; 128/661.08
[58] Field of Search .................... 128/653.1, 660.01, 128/661.08–661.1; 73/861.25, 861.12; 307/126; 324/627–628

[56] References Cited

U.S. PATENT DOCUMENTS

| | | | |
|---|---|---|---|
| 2,862,203 | 11/1958 | Skaraeus et al. | 343/18 |
| 2,986,731 | 5/1961 | Harmon | 343/17.1 |
| 3,011,053 | 11/1961 | Sev | 250/20 |
| 3,815,582 | 6/1974 | Schuette | 128/2.05 F |
| 3,882,861 | 5/1975 | Kettering et al. | 128/214 E |
| 3,887,919 | 6/1975 | Christensen et al. | 343/18 E |
| 3,982,535 | 9/1976 | Bahrton | 128/214 E |
| 3,992,709 | 11/1976 | Watanabe et al. | 343/7.5 |
| 4,060,485 | 11/1977 | Eaton | 210/87 |
| 4,063,551 | 12/1977 | Sweeney | 128/2.05 P |
| 4,080,966 | 3/1978 | McNalley et al. | 128/214 E |
| 4,114,152 | 9/1978 | Wiedemann et al. | 343/7.7 |
| 4,148,314 | 4/1979 | Yin | 128/214 E |
| 4,231,366 | 11/1980 | Schael | 128/214 E |
| 4,309,993 | 1/1982 | Brown | 128/214 E |
| 4,373,525 | 2/1983 | Kobayashi | 128/214 E |
| 4,429,302 | 1/1984 | Vandebult | 340/572 |
| 4,444,546 | 4/1984 | Pazemenas | 417/12 |
| 4,447,191 | 5/1984 | Bilstad et al. | 417/12 |
| 4,460,353 | 7/1984 | Deckert et al. | 604/31 |
| 4,498,901 | 2/1985 | Finch | 604/65 |
| 4,537,200 | 8/1985 | Widrow | 128/696 |
| 4,540,946 | 9/1985 | Sainz et al. | 328/167 |
| 4,542,657 | 9/1985 | Barber et al. | 73/861.25 |
| 4,589,822 | 5/1986 | Clausen et al. | 415/170 A |
| 4,596,254 | 6/1986 | Adrian et al. | 128/666 |
| 4,690,002 | 9/1987 | Hubbard et al. | 73/861.25 |
| 4,766,905 | 8/1988 | Namekawa | 128/663 |

(List continued on next page.)

OTHER PUBLICATIONS

A submission dated Jul. 16, 1991 by Sarns 3M Healthcare to the Food and Drug Administration regarding a Delphin II Centrifugal System embodying the invention disclosed in U.S. Pat. No. 5,368,554.

*Primary Examiner*—Francis Jaworski
*Attorney, Agent, or Firm*—Marshall, O'Toole, Gerstein, Murray & Borun

[57] ABSTRACT

A Doppler flowmeter, which is capable of distinguishing reflected Doppler signals from spurious electrical interference signals, is provided with a multi-frequency transmitter, adapted to be coupled to a conduit through which liquid constituents may flow, for transmitting a first transmitted signal at a first frequency into the conduit during a first period of time and a second transmitted signal at a second frequency into the conduit during a second period of time, the second frequency being substantially different than the first frequency. The flowmeter includes a receiver for receiving signals including a first received signal received during the first period of time and a second received signal received during the second period of time, the first received signal having a third frequency and the second received signal having a fourth frequency. The flowmeter includes a Fourier transform which generates a first difference signal based upon a first frequency difference between the first and third frequencies and a second difference signal based upon a second frequency difference between the second and fourth frequencies. The flowmeter includes means for determining whether the first frequency difference substantially differs from the second frequency difference and means for generating a flow signal based only upon difference signals which have a frequency difference substantially equal to the transmission frequency difference.

28 Claims, 9 Drawing Sheets

U.S. PATENT DOCUMENTS

| | | | |
|---|---|---|---|
| 4,770,185 | 9/1988 | Silverstein et al. | 128/661.08 |
| 4,778,445 | 10/1988 | Hubbard et al. | 604/4 |
| 4,781,525 | 11/1988 | Hubbard et al. | 415/30 |
| 4,863,425 | 9/1989 | Slate et al. | 604/65 |
| 4,899,760 | 2/1990 | Jaeb et al. | 128/696 |
| 4,989,609 | 2/1991 | Smith et al. | 128/661.08 |
| 4,993,418 | 2/1991 | Weaver et al. | 128/661.08 |
| 5,010,887 | 4/1991 | Thornander | 128/696 |
| 5,090,250 | 2/1992 | Wada | 73/861.12 |
| 5,105,815 | 4/1992 | Hall et al. | 128/661.08 |
| 5,171,212 | 12/1992 | Buck et al. | 604/4 |
| 5,243,976 | 9/1993 | Ferch-Petric et al. | 607/19 X |
| 5,368,554 | 11/1994 | Nazarian et al. | 604/4 |

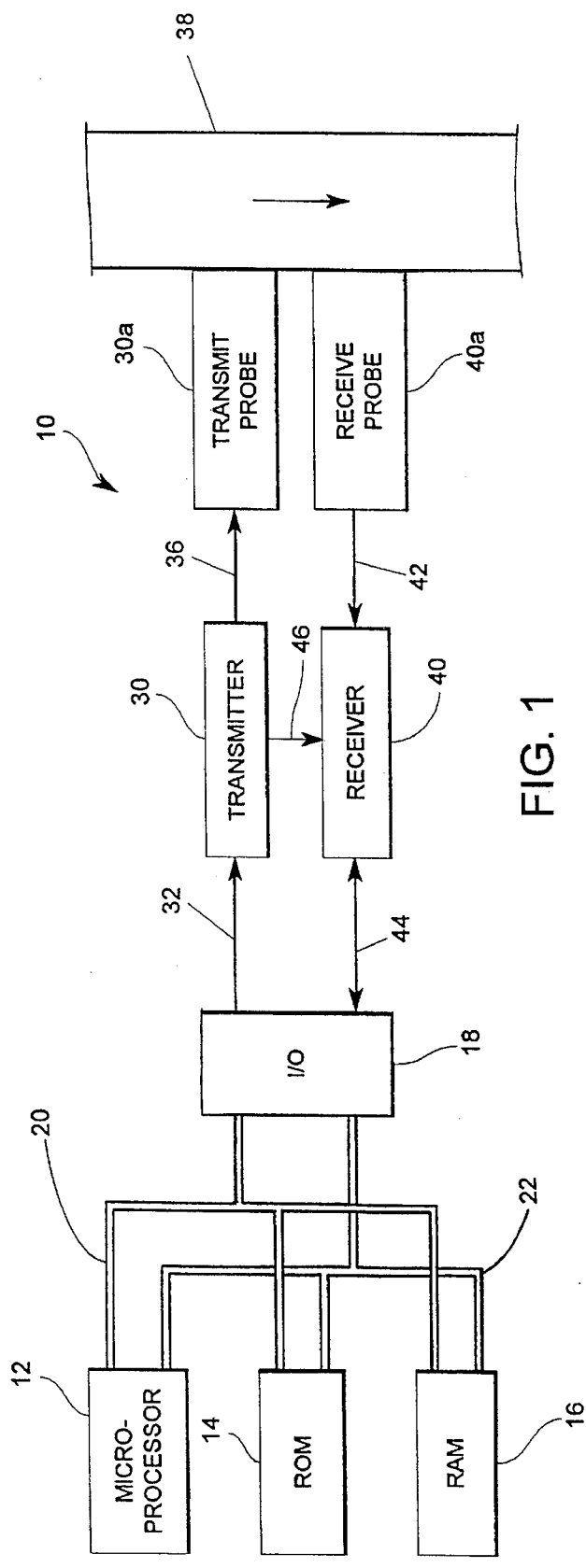
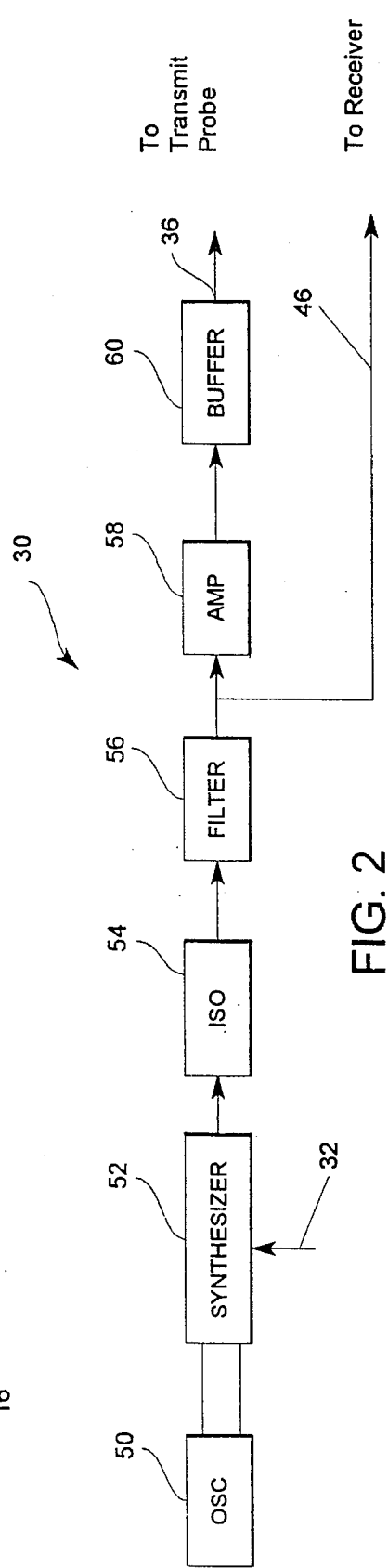
FIG. 1
FIG. 2

5,564,420

MEDICAL DEVICE WITH EMI DETECTION AND CANCELLATION

BACKGROUND OF THE INVENTION

The present invention generally relates to a medical device capable of detecting the presence of electromagnetic interference (EMI) and effectively cancelling the interference to prevent it from adversely affecting the detection of other electrical signals.

During operation, various medical devices transmit and receive electrical signals which can be interfered with due to the presence of EMI. An example of one such medical device is a Doppler flowmeter used to detect the magnitude of blood flow during surgery, for example. Such a flowmeter, which is disclosed in U.S. Pat. No. 5,368,554 to Nazarian, et al., operates by periodically transmitting an ultrasonic signal through flowing blood via a transmitter, receiving an ultrasonic signal reflected from the transmitted signal via a receiver, and converting the received signal into an electrical signal of the same frequency. The frequency of the received signal differs from the frequency of the transmitted signal by an amount which corresponds to the magnitude of the blood flow, due to the well-known Doppler shift phenomenon.

The operation of such a flowmeter can be disrupted by the presence of EMI, causing the flowmeter to generate erroneous blood flow readings. One example of EMI is "Bovie" interference, which is caused by the use of an electrosurgical unit during surgery. In such a unit, high-energy radio-frequency ("RF") radiation is used to heat a metal tip of the unit used for cauterizing purposes. The RF radiation produced by such a unit can severely disrupt the operation of a Doppler flowmeter for a number of reasons. First, the intensity of the RF radiation generated by an electro-surgical unit is typically much greater than that of the electrical signals from which the blood flow readings are determined. Second, the receiver is typically connected to the Doppler flowmeter via a relatively long cable, which tends to act as an antenna, thus attracting the RF radiation and aggravating the interference with the relatively weak signal the Doppler flowmeter is trying to detect. Finally, the frequency of the RF radiation emitted by an electro-surgical unit may vary over a relatively wide frequency band, and the frequency band typically varies with the particular electro-surgical unit used, which makes attempts to reduce the effects of such radiation by using conventional electromagnetic-shielding techniques and filtering difficult, if not impossible.

SUMMARY OF THE INVENTION

The present invention is directed to a medical device, such as a Doppler flowmeter, and a method of operating it, which is capable of detecting the presence of electrical interference and cancelling such interference to prevent it from interfering with other electrical signals being detected by the device.

The medical device includes a multi-frequency transmitter for transmitting a plurality of transmitted signals, including a first signal transmitted at a first frequency during a first period of time and a second signal transmitted at a second frequency during a second period of time. The second frequency is substantially different than the first frequency by a transmission frequency difference. The medical device has a receiver for receiving a plurality of received signals, including a first signal received during the first period of time and a second signal received during the second period of time. At least one of the received signals is derived from one of the transmitted signals, such as by being reflected by liquid constituents flowing through a conduit to which the receiver is coupled. The device also includes means for detecting the presence of electrical interference by detecting that one of the received signals has a frequency which is independent of the first and second transmission frequencies.

The detecting means may have means for generating a plurality of difference signals, including a first difference signal based upon a first frequency difference between the first transmitted and received signals and a second difference signal based upon a second frequency difference between the second transmitted and received signals, and means for determining whether the first frequency difference substantially differs from the second frequency difference. The device may have means for generating a flow signal based upon one of the difference signals, or alternatively, based only upon the difference signals which have a frequency difference substantially equal to the transmission frequency difference, and means for cancelling one of the difference signals if the first frequency difference substantially differs from the second frequency difference.

The means for determining whether the first frequency difference substantially differs from the second frequency difference may comprise means for generating a first set of frequency-domain samples from the first transmitted and received signals and a second set of frequency-domain samples from the second transmitted signal and received signals, and means for comparing a first sample from the first set with a second sample from the second set, the first and second samples having a frequency offset substantially equal to the transmission frequency difference.

The signal-to-noise ratio of the electrical signals detected by the medical device, such as Doppler signals where the device is a flowmeter, may be increased by summing the frequency-domain samples in the two sets of frequency-domain samples.

The method of operation of the device may include the steps of: (a) transmitting a plurality of transmitted signals, including a first transmitted signal having a first frequency; (b) receiving a plurality of received signals, including a first signal received while the first transmitted signal is being transmitted, at least one of the received signals being derived from one of the transmitted signals; (c) transmitting a second transmitted signal having a second frequency substantially different than the first frequency; (d) receiving a second received signal while step (c) is being performed; and (e) detecting the presence of electrical interference by detecting that one of the received signals has a frequency which is independent of one of the first and second frequencies.

Step (e) described above may be a multi-part step having the following substeps: (e1) generating a first set of frequency-domain samples from the first transmitted signal and the first received signal; (e2) generating a second set of frequency-domain samples from the second transmitted signal and the second received signal; (e3) comparing a sample from the first set with a sample from the second set; and (e4) repeating step (e3) for a plurality of samples. Step (e3) may comprise the step of comparing a first sample from the first set with a second sample from the second set, the first and second samples having a frequency offset substantially equal to the transmission frequency. The method may also include the step of summing the samples of the first set with the samples of the second set.

These and other features and advantages of the present invention will be apparent to those of ordinary skill in the art in view of the detailed description of the preferred embodi-

BRIEF DESCRIPTION OF THE DRAWINGS

FIG. 1 is a block diagram of a flowmeter in accordance with a preferred embodiment of the invention shown attached to a conduit;

FIG. 2 is a block diagram of a transmitter used in the flowmeter of FIG. 1;

DETAILED DESCRIPTION OF A PREFERRED EMBODIMENT

Figure 3:
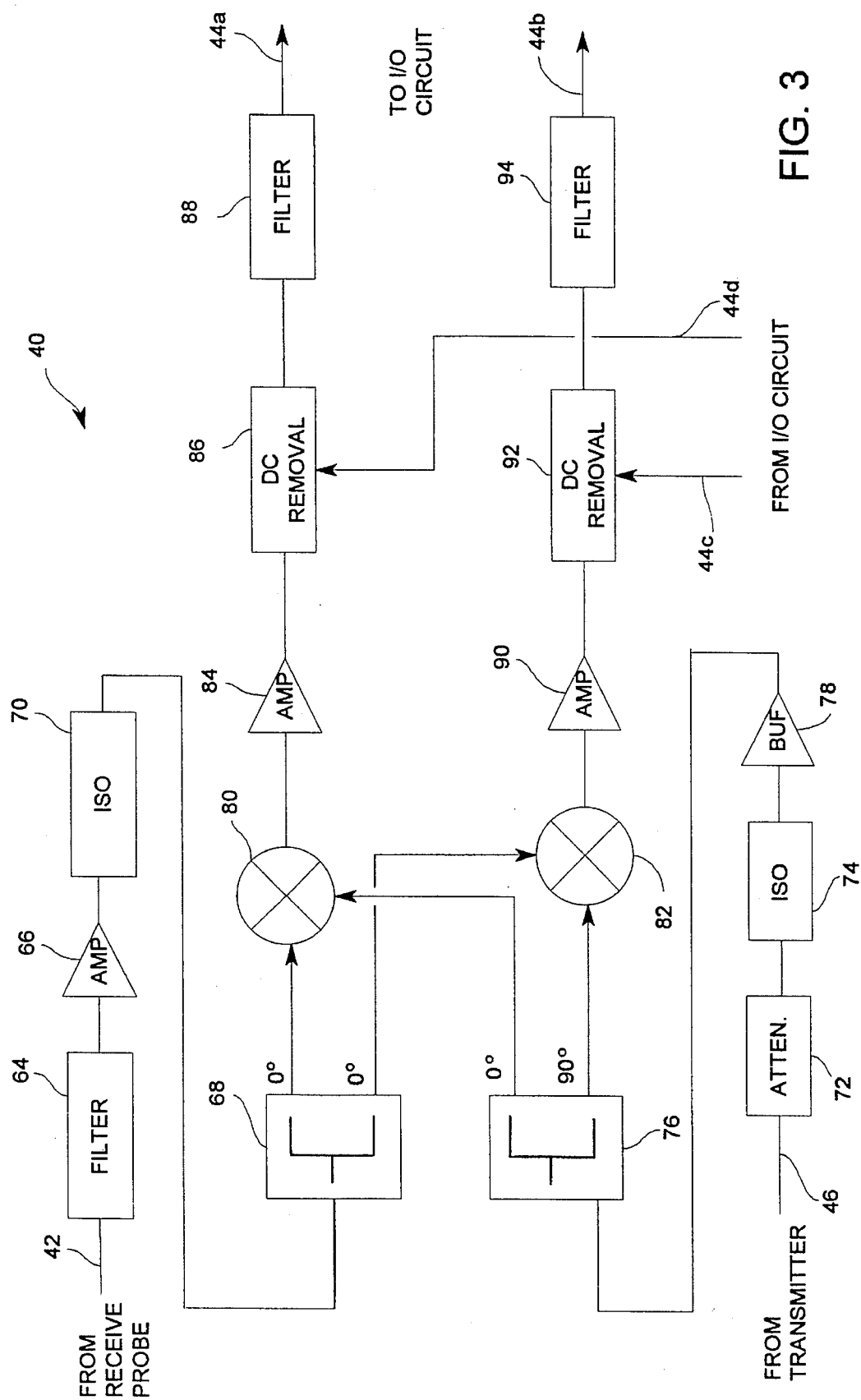
FIG. 3 is a block diagram of a receiver used in the flowmeter of FIG. 1.

FIG. 1 is a block diagram of a preferred embodiment of a flowmeter 10 in accordance with the invention. The flowmeter 10 includes a controller in the form of a microprocessor 12, a ROM 14, a RAM 16, and an I/O circuit 18 which are interconnected by an address bus 20 and a data bus 22. The flowmeter 10, which operates on the Doppler principle, includes a transmitter 30 coupled to the I/O circuit 18 via a transmit line 32. The transmitter 30 generates electrical excitation signals and transmits those signals to a transmit probe 30a via a line 36. The transmit probe 30a converts those electrical signals into ultrasonic energy and radiates such energy into a conduit 38 through which blood is flowing, as indicated by the arrow.

After being reflected by various constituents of the blood flowing through the conduit 38, the ultrasonic energy is detected by a receive probe 40a, which converts it into electrical signals and transmits those signals to a receiver 40 via a line 42. The receiver 40 is coupled to the I/O circuit 18 via a line 44 and to the transmitter 30 via a line 46.

As is well known, the difference in frequency between the transmitted energy and the received energy is indicative of the magnitude of blood flow in accordance with the Doppler principle. One particular manner of attaching the transmit and receive probes 30a, 40a to a conduit is illustrated in U.S. Pat. No. 4,989,609 to Smith, et al., the disclosure of which is incorporated herein by reference.

TRANSMITTER

A block diagram of the transmitter 30 (excluding its probe 30a) is shown in FIG. 2. The transmitter 30 includes an oscillator 50 that generates a high-frequency periodic signal and transmits such signal to a conventional direct digital synthesizer 52, which acts to frequency-divide the periodic signal generated by the oscillator 50, under the control of a control signal provided by the microprocessor 12 to the synthesizer 52 via the line 32. The synthesizer 52 thus generates an excitation signal of a selected frequency, which is then isolated by a conventional isolation circuit 54 and filtered by a low-pass filter 56. The excitation signal is amplified by a tuned-circuit amplifier 58, and is then transmitted to an output buffer 60, which is connected to the transmit probe 30a via the line 36.

Although one manner of generating the transmitter excitation signal is described, the particular manner of generating that signal is not considered to be important to the invention.

RECEIVER

A block diagram of the receiver 40 is shown in FIG. 3. The basic function of the receiver 40 is to generate a set of real and imaginary digital time-domain samples in response to the output of the receive probe 40a and the transmitter excitation signal. As described below, the time-domain samples are used by a conventional fast Fourier transform ("FFT") routine which generates a set of frequency-domain samples therefrom. The particular manner of generating the time-domain samples as shown in FIG. 3 is not considered to be important to the invention.

Referring to FIG. 3, the electrical received signal generated by the receive probe 40a is filtered via a filter 64 and amplified by an amplifier 66. The received signal is provided to a splitter circuit 68, which is electrically isolated from the amplifier 66 via an isolation circuit 70. The transmitted signal generated by the transmitter 30 is provided to the receiver 40 via the line 46. The transmitted signal is processed by an attenuator circuit 72, isolated via an isolation circuit 74, and provided to a splitter circuit 76 via a buffer 78.

The splitter circuit 68 splits the received signal into two signals nearly identical thereto, except that the magnitude of the split signals is about one-half that of the original signal. The split received signals generated by the splitter 68 also have the same phase as each other and as the original received signal. The splitter circuit 76 performs the same function on the transmitted signal, except that the phase of one of the split transmitted signals is delayed by 90° with respect to the phase of the other split transmitted signal.

One of the split received signals and the undelayed split transmitted signal are provided to a mixer 80, a conventional circuit for combining signals, which generates the "real component" of the signal. The other split received signal and the delayed split transmitted signal are provided to a mixer 82, which generates the "imaginary component" of the signal.

The signal output from the mixer 80 is amplified by a fixed-gain amplifier 84, processed by a DC removal circuit 86 to remove unwanted DC components of the signal, and filtered by a low-pass filter 88 to remove the high-frequency components of the signal, which is transmitted to the I/O circuit 18 via a line 44a. The received signal is then sampled at a relatively high rate by an analog-to-digital (A/D) converter (not shown) incorporated in the microprocessor 12 to store a set of time-domain samples of the received signal (such as 1,024 time-domain samples).

The DC removal circuit 86, which is used to remove unwanted DC components from the received signal, may be provided in the form of a D/A converter connected to one input of a two-input summer (not shown). The D/A converter converts a binary signal provided on the line 44d to an analog signal, which is provided to one of the two inputs of the summer. The other input of the summer receives the received signal from the amplifier 84. The summer subtracts the analog signal generated by the D/A converter from the received signal output from the amplifier 84. The DC removal circuit 92 has the same structure and operation.

The signal output from the mixer 82 is processed in a manner similar to the signal output by the mixer 80 by components 90-94. The received signal generated on the line 44b is then sampled at the same rate as the signal generated on the line 44a by an A/D converter (not shown) incorporated in the microprocessor 12 to store a set of time-domain samples of the received signal.

The particular construction of the receiver 40 is not considered important to the invention, and numerous different receiver circuits could be utilized.

Although conventional shielding techniques are generally insufficient to prevent Bovie interference, such techniques may nevertheless be utilized in connection with the electronics disclosed herein. Such techniques include splitting the circuitry into different sections, isolating the different sections via isolation transformers and radio-frequency interference (RFI) shields, powering the different sections by different power supplies, providing separate ground planes for the different sections, and/or using voltage regulators, inductor beads and low pass filters on the power supply lines.

GENERAL OPERATION

Figure 4A:
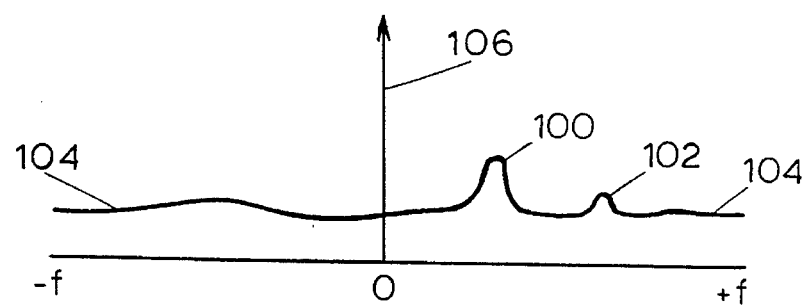
FIGS. 4A and 4B illustrate two examples of electrical interference and how such interference may affect a Doppler signal that corresponds to fluid flow.
Figure 4B:
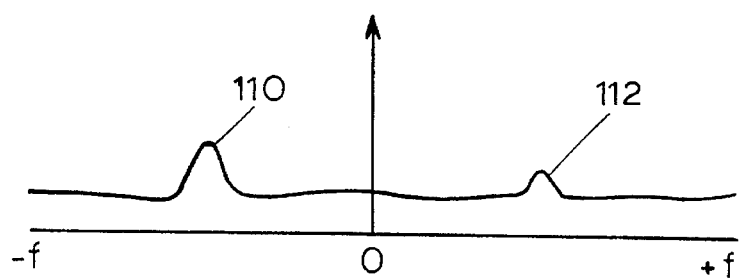

The Doppler signals generated by the flowmeter 10 can be adversely affected by the presence of electromagnetic interference (EMI), also referred to herein as electrical interference, such as Bovie interference. FIGS. 4A-4B illustrate two examples of such interference and how such interference may affect a Doppler signal.

FIG. 4A is a frequency-domain representation of a Bovie interference signal 100, a Doppler signal 102 that represents fluid flow, and background or white noise 104. Both the Doppler signal 102 and the Bovie signal 100 are shown to have a positive frequency, meaning that they would correspond to positive fluid flow. The zero frequency at which there would be zero flow is represented by an arrow 106. In the example represented by FIG. 4A, absent some manner of detecting Bovie signals, the Bovie signal 100 could be erroneously interpreted to be the Doppler signal, instead of the real Doppler signal 102, thus causing an erroneous blood flow reading to be generated.

A second example of how a Bovie signal could occur is shown in the frequency-domain representation of FIG. 4B, in which a Bovie signal 110 is shown to have a negative frequency, and a Doppler signal 112 is shown to have a positive frequency. Thus, in the case of FIG. 4B, if the Bovie signal 110 were erroneously determined to be the Doppler signal, not only would the blood flow reading be erroneous, but the flowmeter 10 would erroneously calculate a negative blood flow, which would trigger a backflow alarm, as described in U.S. Pat. No. 5,368,554 to Nazarian, et al. FIGS. 4A and 4B are merely exemplary of how Bovie signals might occur and do not purport to cover all situations.

Figure 5:
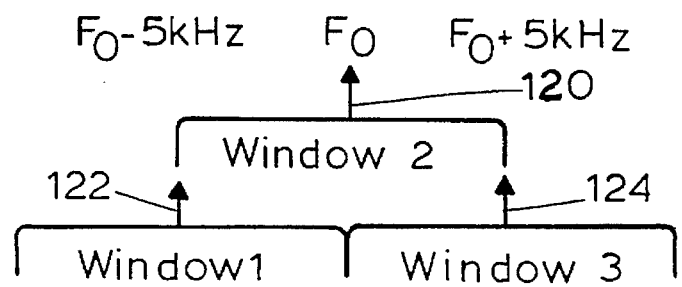
FIG. 5 illustrates a number of frequency windows utilized during the operation of the flowmeter.

The general manner in which electrical interference is detected and cancelled by the flowmeter 10 is described below in connection with FIGS. 5 and 6A-6C. Referring to FIG. 5, in the preferred embodiment of the invention, each time a blood flow reading is to be taken, the transmitter 30 is operated at three different frequencies: a center frequency $F_0$ indicated by an arrow 120, a frequency (indicated by an arrow 122) that is lower than the center frequency $F_0$, and a frequency (indicated by an arrow 124) that is higher than the center frequency $F_0$.

When the center frequency $F_0$ is being transmitted by the transmitter 30, the flowmeter 10 is responsive to all signals received by the receiver 40 within a frequency band or window, which in FIG. 5 is labelled "Window 2," the "width" of which is 10 kilohertz (kHz). During the transmission of the lower frequency 122 and the higher frequency 124, the flowmeter 10 is responsive to all signals received by the receiver 40 within the frequency windows "Window 1" and "Window 3," respectively. The width of those windows is equal to the width of Window 1 (10 kHz).

In the preferred embodiment, the lower frequency 122 is selected to coincide with the low-frequency edge of Window 2, which in this example is $F_0-5$ kHz, and the higher frequency 124 is selected to coincide with the high-frequency edge of Window 2, which in this example is $F_0+5$ kHz.

Figure 6A:
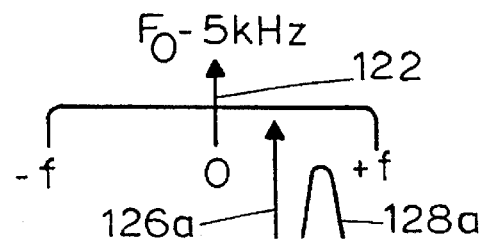
FIGS. 6A–6C illustrate the positions of an interference signal and a Doppler signal with respect to the frequency windows of FIGS. 5A and 5B.
Figure 6B:
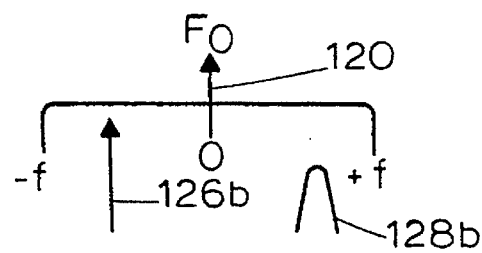
Figure 6C:
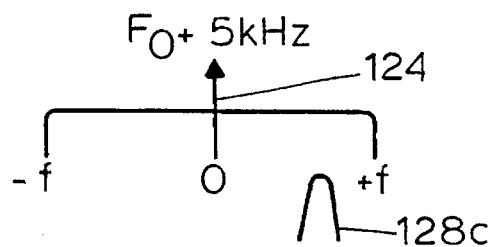

FIGS. 6A-6C illustrate the three windows described above along with a number of Bovie interference signals 126 and Doppler signals 128 that were detected within the frequency windows during the transmission of the frequencies 120, 122, 124. Each frequency window has a negative frequency boundary $-f$ and a positive frequency boundary $+f$ (f being 5 kHz with the specific windows described above).

Referring to FIG. 6A, during the transmission of the lower frequency signal 122, the flowmeter 10 detects, within Window 1, both a Bovie signal 126a and a Doppler signal 128a. Referring to FIG. 6B, during the transmission of the center frequency signal 120, the flowmeter 10 detects, within Window 2, both a Bovie signal 126b and a Doppler signal 128b. Referring to FIG. 6C, during the transmission of the higher frequency signal 124, the flowmeter 10 detects, within Window 3, a Doppler signal 128c.

The frequency at which each of the signals 126a-126b, 128a-128c is shown is the Doppler frequency, i.e. the frequency difference between the transmitted signal and the received signal. It should be noted that each of the three Doppler signals 128a-128c occurs at the same frequency within each window. That is to be expected since, assuming the magnitude of the blood flow does not substantially change between the transmission of the three frequencies 120, 122, 124, the same blood flow will generate the same Doppler frequency shift with respect to each of the three transmitted frequencies 120, 122, 124.

It should further be noted that the location of the Bovie interference signals 126a, 126b within each of the windows is different. That is also to be expected, assuming that the frequency of the electrical interference which causes the signals 126a, 126b to be generated does not change over short periods of time, since the "Doppler shift" perceived by the flowmeter 10 (but which is not actually a Doppler shift because the interference signal is not a reflected signal) will change as the frequency of the transmitted signals 120, 122, 124 changes.

The flowmeter 10 takes advantage of the fact that the frequency of the electrical interference is independent of the frequency of the transmission signals 120, 122, 124, while the frequency of the Doppler signals 128 depends upon the frequency of the transmission signals 120, 122, 124.

Since an electro-surgical unit may emit RF interference signals at a number of different frequencies, it should be understood that there may be multiple interference signals, instead of just one as shown in FIGS. 6A–6C.

The specific manner in which electromagnetic interference is detected and cancelled is described below in connection with FIGS. 7–12, which include flowcharts of a computer program stored in the ROM 14 and executed by the microprocessor 12.

MAIN ROUTINE

Figure 7:
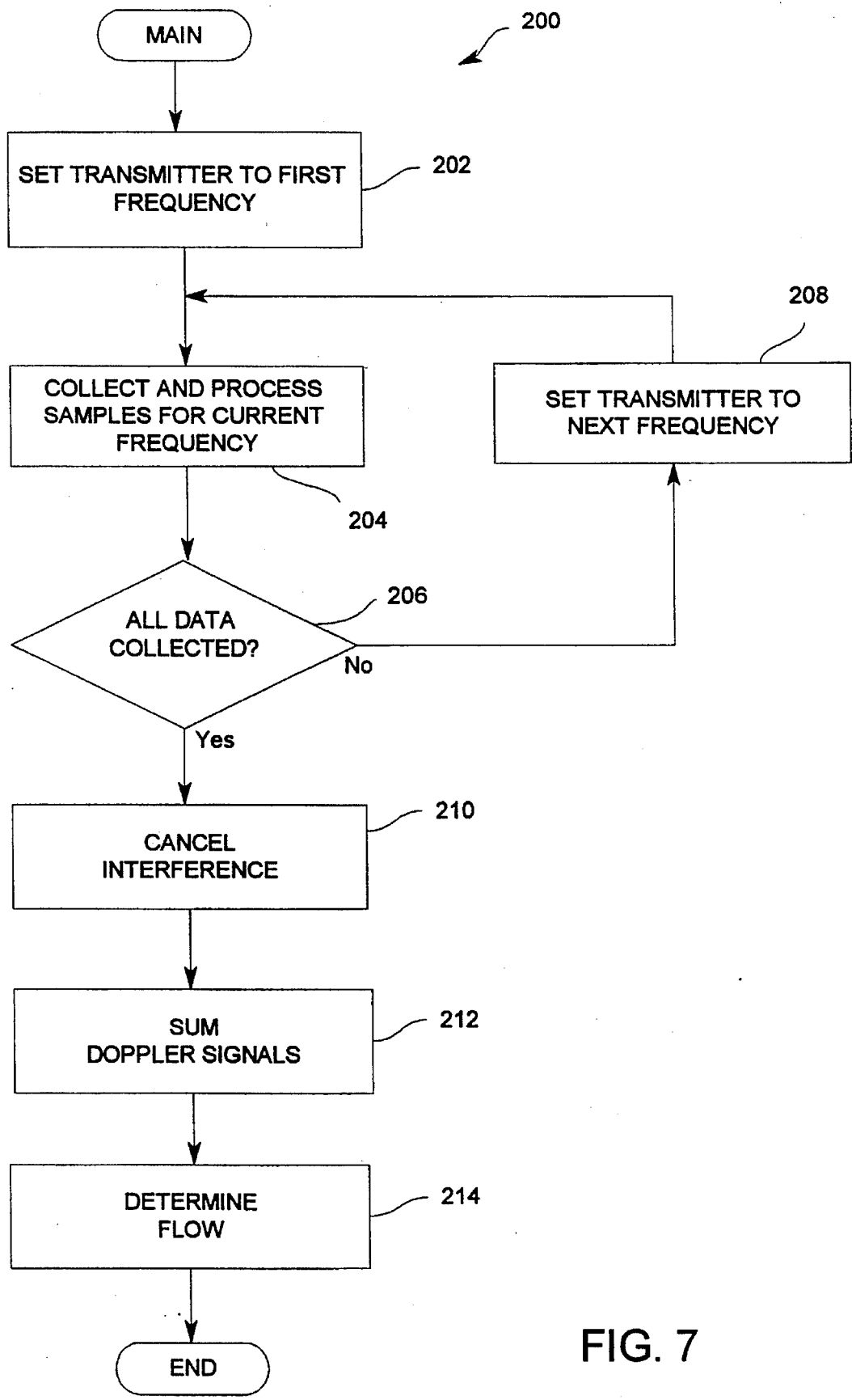
FIG. 7 is a flowchart of the overall operation of the flowmeter of FIG. 1.

FIG. 7 illustrates a main operating routine 200 which is periodically performed, such as every 50 milliseconds for example, by the flowmeter 10 to determine the flow through the conduit 38.

Referring to FIG. 7, at step 202, the transmitter 30 is set to a first frequency (via the control signal provided to the frequency synthesizer 52 by the line 32 in FIG. 2), and at step 204, time-domain samples for the current transmission frequency are collected by the A/D converters as described above and processed by the microprocessor 12.

At step 206, the program determines whether the time-domain samples for all of the three transmission frequencies have been collected. If not, the program branches to step 208, where the transmitter 30 is set to the next transmission frequency, and steps 204, 206 are repeated until all the time-domain samples are collected.

It is assumed that the frequency of the electrical interference will not substantially change over relatively short periods of time, such as a number of milliseconds, for example. However, the frequency of the interference may "jump around" (depending upon the particular model of the electro-surgical unit) over longer periods of time, such as one second, for example. Thus, it is generally advantageous to send the three transmit signals 120, 122, 124 very quickly in succession (i.e. to "space" them as closely together as possible) so that the frequency of the interference does not have sufficient time to substantially change during the time between transmission of the signals 120, 122, 124.

At step 210, any interference signals are cancelled, as described below. Then at step 212, the signal contents of the frequency-domain windows are summed, as described below, to increase the signal-to-noise ratio of the Doppler signal. At step 214, the flow is calculated based on the Doppler signal generated at step 212.

SAMPLE COLLECTION AND PROCESSING ROUTINE

Figure 8:
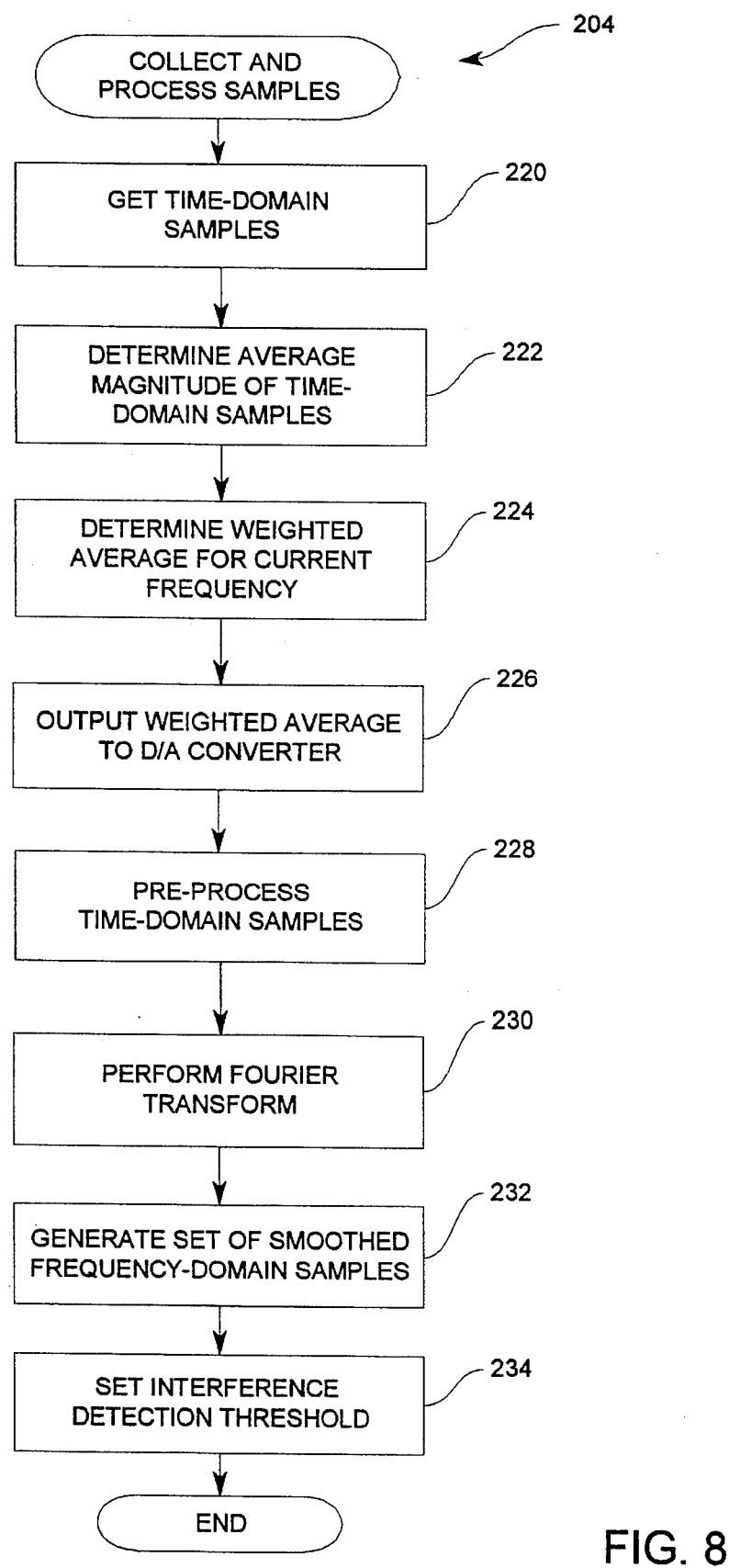
FIG. 8 is a flowchart of a sample collection and processing routine shown schematically in FIG. 7.

FIG. 8 illustrates a flowchart of a sample collection and processing routine schematically shown as step 204 in FIG. 7. It should be understood that the routine 204 is performed for both of the signals generated on the lines 44a, 44b shown in FIG. 3. It should be appreciated that some of the steps below could be pipelined to allow the routine 204 to be executed more quickly.

Referring to FIG. 8, the first step of the routine 204 retrieves from memory the real and imaginary time-domain samples generated by the A/D converters (not shown) in the microprocessor 12. These samples are referred to herein as "time-domain" samples since they are samples periodically taken over a period of time.

Steps 222–226 are used to control the DC removal circuits 86, 92 shown in FIG. 3. At step 222, the average magnitude of all the time-domain samples for the current transmission frequency is determined. At step 224, a weighted average of a number of the average signal magnitudes determined at step 222 for the current transmission frequency is determined. For example, step 224 may calculate the weighted average of the last four averages determined during the last four executions of step 222, with the most recent average being weighted most heavily and the least recent average being weighted least heavily, in accordance with the following equation:

$$Ave_w = (0.4)Ave_4 + (0.3)Ave_3 + (0.2)Ave_2 + (0.1)Ave_1,$$

where $Ave_w$ is the weighted average determined during step 224, $Ave_4$ is the most recent average determined during step 222, and $Ave_1$ is the least recent average determined during a previous performance of step 222. Three separate weighted averages are determined and maintained, one for each of the three transmission frequencies.

At step 226, the weighted average determined at step 224 for the transmission frequency to be transmitted next is transmitted, in the form of a multi-bit binary number, to the D/A converters of the DC removal circuits 86, 92.

At step 228, the time-domain samples may be preprocessed by manipulating a number of them to result in a smoother set frequency-domain signals when a Fourier transform (described below) is made. For example, all the time-domain signals except a contiguous subset of the signals (e.g. the middle 64 signals out of the 1,024 total signals) may be attenuated. The attenuation may gradually increase as the "distance" from the selected subset of signals increases. When the Fourier transform is subsequently performed, the above manipulation may advantageously cause the width of any interference signals to be increased; consequently, a slight change in the frequency of an interference signal between the transmission of subsequent transmission signals will not cause the interference signal to go undetected.

Figure 9:
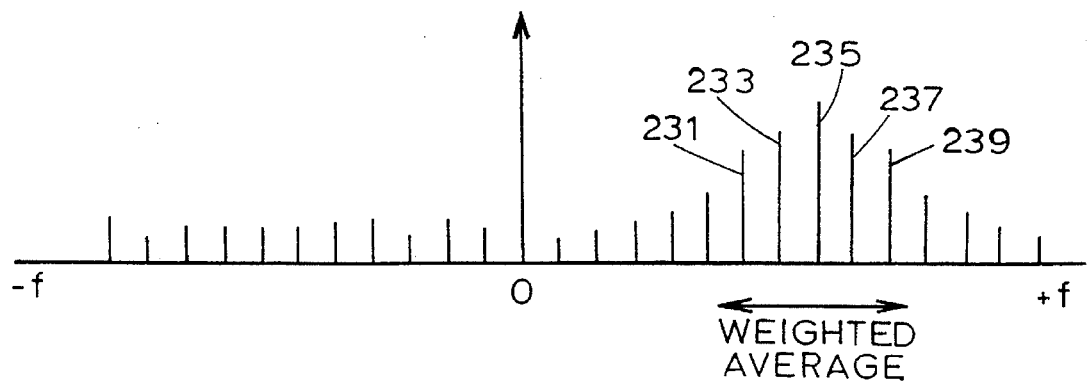
FIG. 9 is an illustration of a set of frequency-domain samples generated by a Fourier transform.

At step 230, a fast Fourier transform ("FFT") is performed on the time-domain samples to generate a set of frequency-domain samples. The FFT may be accomplished in a conventional manner based on an FFT routine disclosed in Texas Instrument's Digital Signal Processing Applications with the TMS320 Family, which is incorporated herein by reference. Such a routine is also referred to in U.S. Pat. No. 4,989,609 to Smith, et al., the disclosure of which is incorporated by reference herein. The FFT routine may be coded in assembly language for increased speed of operation. The result of the FFT routine is a set of samples (e.g. such as 1,024 samples) referred to as "frequency-domain" samples or "bins" such as shown in FIG. 9. Each sample or bin has a magnitude (represented by a binary number in the flowmeter 10 and by an arrow in FIG. 9) for a frequency within the frequency range of interest, the magnitude for each frequency being proportional to the square of magnitude of the corresponding time-domain signal.

A number of frequency-domain Doppler samples are illustrated in FIG. 9 (no samples corresponding to Bovie signals are shown). As illustrated, the samples vary in magnitude, generally increasing towards a peak at the sample designated 235 at a positive Doppler frequency.

Referring back to FIG. 8, at step 232, a set of smoothed frequency-domain samples is generated for the purpose of setting an interference detection threshold. Each smoothed frequency-domain sample is an average of a predetermined number, such as three, corresponding unsmoothed samples. For example, the magnitudes of three (of the 1,024 samples) adjacent smoothed frequency values F are determined from the unsmoothed values f in accordance with the following equations:

$$F_1 = (f_0 + f_1 + f_2)/3$$

$$F_2 = (f_1 + f_2 + f_3)/3$$

$$F_3 = (f_2 + f_3 + f_4)/3$$

At step 234, an interference detection threshold is set a predetermined amount, such as 12 decibels (dB), above the smallest smoothed value in the smoothed frequency-domain samples. The smoothed values are used only for the purpose of setting the interference threshold, and are not used in the interference cancellation or Doppler summing routines described below. The original unsmoothed values are maintained in memory for later use in the interference cancellation and summing routines.

INTERFERENCE CANCELLATION ROUTINE

Figure 10:
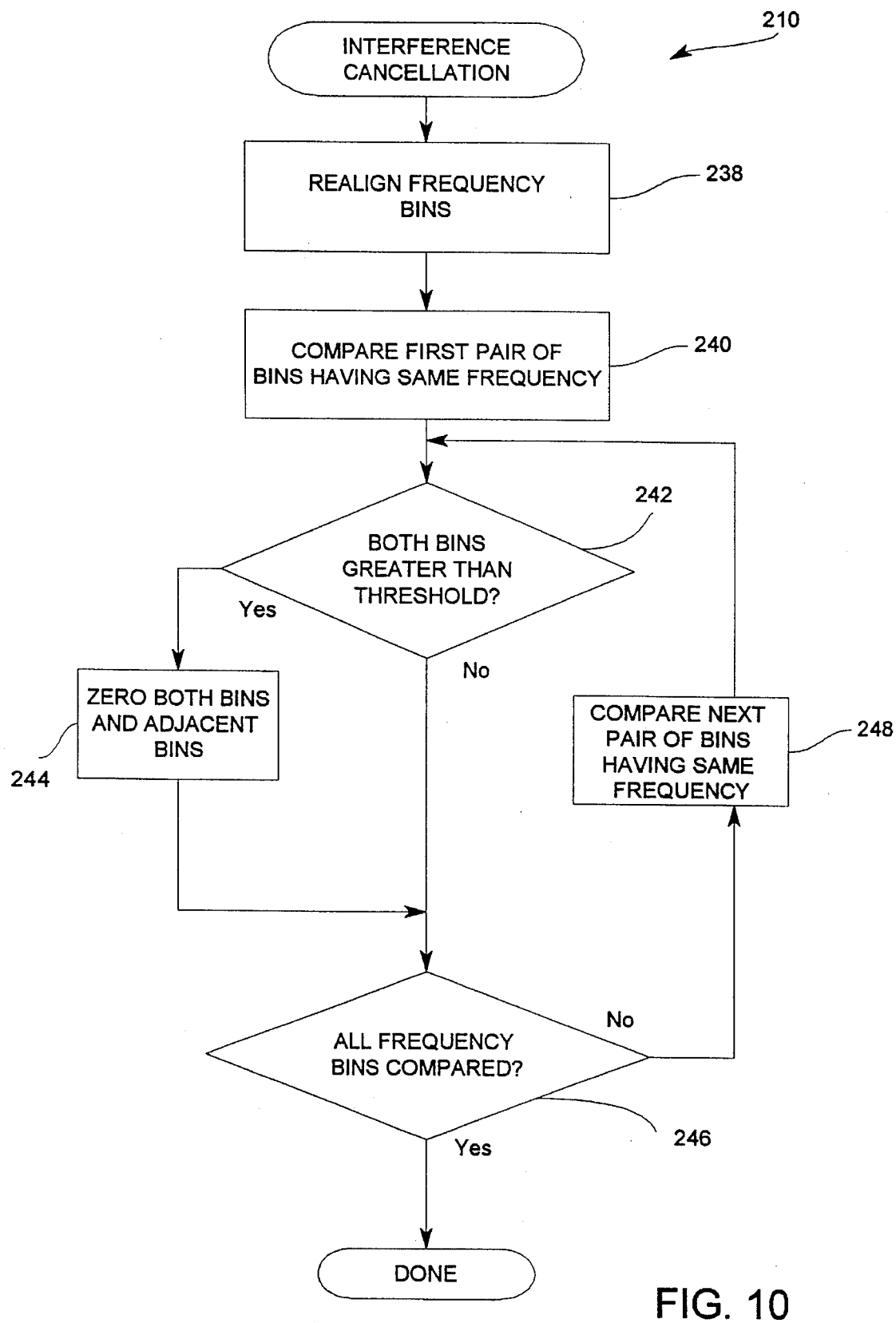
FIG. 10 is a flowchart of an interference cancellation routine shown schematically in FIG. 7.

FIG. 10 illustrates a flowchart of an interference cancellation routine schematically shown as step 210 in FIG. 7. After the completion of the sample collection and processing routine 204, the flowmeter 10 will have generated a set of frequency-domain signals or bins (each set having 1,024 frequency bins, for example) for each of the three windows shown in FIGS. 6A–6C.

Figure 11A:
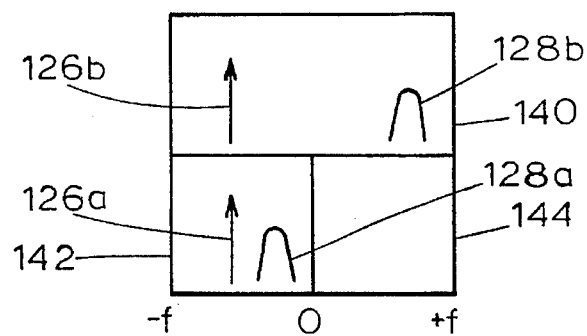
FIGS. 11A–11D illustrate the position of a number of windows used in the operation of the flowmeter.

Referring to FIG. 10, at step 238, the frequency bins corresponding to the three windows shown in FIGS. 6A–6C are "realigned." In particular, each of the 512 frequency bins between the frequencies of 0 and +f in the frequency window of FIG. 6A is decreased in frequency by an amount equal to the difference in the frequencies of the transmission signals 120, 122, which in this case is 5 kHz. This frequency shift or realignment results in the interference signals 126a, 126b occurring at the same frequency (or being vertically aligned in the same position) and in the Doppler signals 128a, 128b occurring at different frequencies, or becoming "misaligned," as shown in FIG. 11A.

A second alignment is also made during step 238. In particular, each of the 512 frequency bins between the frequencies of –f and 0 in the frequency window of FIG. 6C is increased in frequency by an amount equal to the difference in the frequencies of the transmission signals 120, 124, which in this case is 5 kHz. The result of the two frequency alignments made during step 238 is illustrated in FIG. 11A, in which a full window 140 of frequency bins and two half-windows 142, 144 of frequency bins are shown.

Then, for each frequency, the signal magnitude for that frequency in the window 140 is compared with the signal magnitude for that frequency in one of the two half-windows 142, 144, (which depends upon whether the frequency is positive or negative). In particular, at step 240, the magnitude of the signal in the first bin (i.e. having frequency –f) in the window 140 is compared with the magnitude of the signal in the first bin in the half-window 142. If both signals have magnitudes greater than the cancellation threshold (which was previously determined at step 234 of FIG. 8), the program branches to step 244 where the signal magnitudes of those two frequency bins are set to zero. Also, since the interference signal may be offset slightly (i.e. may have a slightly different frequency) in the window 140 with respect to one of the windows 142, 144, the two frequency bins adjacent each side of both signals (which have the same frequency and which surpass the threshold) are also set to zero.

If all the frequency bins representing the window 140 have not been compared to the corresponding frequency bins of the half-windows 142, 144 as determined at step 246, the program branches to step 248, where the signal magnitudes of the two corresponding frequency bins at the next frequency are compared. Steps 242–248 are repeated until all of the frequency bins have been compared as determined at step 246.

Figure 11B:
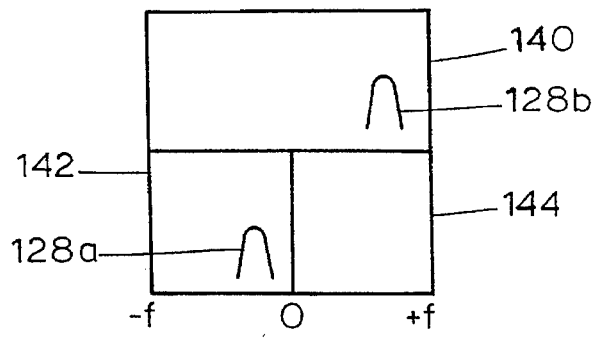

It should be noted that, where there are 1,024 frequency bins representing the window 140 (and thus 512 frequency bins representing each of the half-windows 142, 144), steps 242–248 will be repeated 1,023 times during the process of searching for signals having the same frequency and a magnitude which surpasses the interference threshold. The cancellation routine will cause the interference signals to be eliminated, as shown in FIG. 11B.

DOPPLER SUMMING ROUTINE

Figure 12:
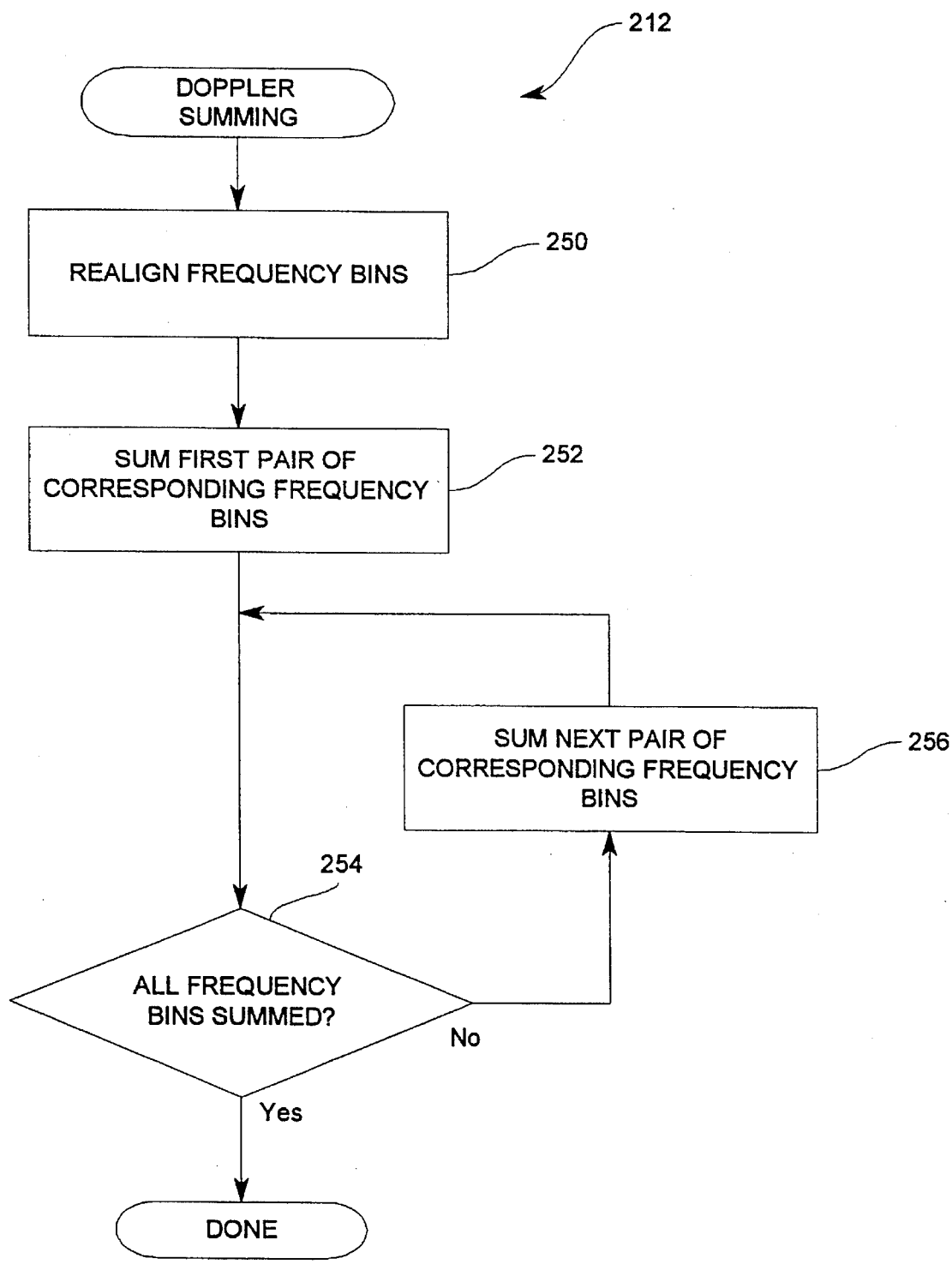
FIG. 12 is a flowchart of a summing routine shown schematically in FIG. 7.

FIG. 12 illustrates a flowchart of a Doppler summing routine schematically shown as step 212 in FIG. 7. After the interference is cancelled by the cancellation routine, the signals in the remaining windows which have the same frequency are summed. This summation step is advantageous in that it increases the signal-to-noise ratio of the Doppler signal, making it easier to detect (the random white noise tends to cancel, rather than add).

Figure 11C:
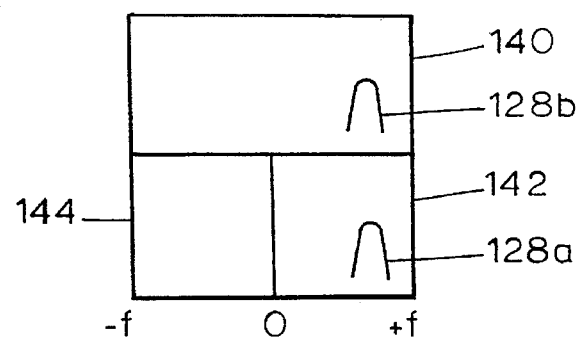

Referring to FIG. 12, at step 250, the two sets of frequency bins representing the two half-windows 142, 144 are "realigned" by shifting the frequency of the bins in each of those two sets. In particular, each of the 512 frequency bins between the frequencies of 0 and –f in the half-window 142 of FIG. 11B is increased in frequency by an amount equal to the difference in the frequencies of the transmission signals 120, 122, which in this case is 5 kHz. This realignment results in the Doppler signals 128a, 128b occurring at the same frequency (or being vertically aligned in the same position) as shown in FIG. 11C.

At step 250, each of the 512 frequency bins between the frequencies of 0 and +f in the half-window 144 of FIG. 11B is decreased by an amount equal to the difference in the frequencies of the transmission signals 120, 124, which in this case is 5 kHz.

Then, for each frequency, the signal magnitude for that frequency in the window 140 is summed with the signal magnitude for that frequency in one of the two half-windows 142, 144 (which depends upon whether the frequency is positive or negative). In particular, at step 252, the magnitude of the signal in the first bin (i.e. having frequency –f) in the window 140 is summed with the magnitude of the signal in the first bin in the half-window 144.

If all the frequency bins representing the window 140 have not been summed with the corresponding frequency bins of the half-windows 142, 144 as determined at step 254, the program branches to step 256, where the signal magnitudes of the two corresponding frequency bins at the next frequency are summed. Steps 254–256 are repeated until all of the frequency bins have been summed as determined at step 254.

Figure 11D:
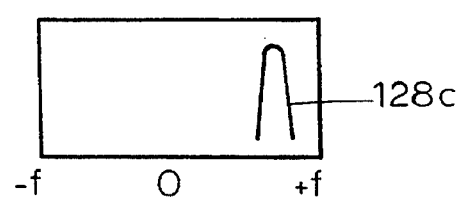

The summing routine will cause result in the generation of a Doppler signal 128c having twice the magnitude of the Doppler signals 128a, 128b, as shown in FIG. 11D. However, it should be noted that the blood flow might change between the transmission of subsequent transmission signals 120, 122, 124, and that there may be little or no frequency overlap between the Doppler signals produced. In that event, the summing routine may still cause a broader peak to be formed from two Doppler signals having two different frequencies (although the resulting Doppler signal may not have twice the magnitude as the original signals). In the event the summing routine did not cause a broader Doppler peak to be formed, the Doppler frequency could still be determined from the resulting individual Doppler peaks by a flow-determination method, such as the ones described below.

FLOW DETERMINATION

Referring back to step 214 of FIG. 7 the flow is determined, based on the summed Doppler signal generated at step 212, in the following manner. First, the Doppler frequency, which generally corresponds to the frequency at which the frequency samples have the largest magnitude, is determined. As shown in FIG. 9, the Doppler frequency is generally represented by the frequency of the sample designated 235.

The Doppler frequency could be determined in numerous ways. The Doppler frequency could be determined simply by locating the sample having the largest magnitude. Alternatively, to eliminate spurious peaks, it could be determined by locating the three adjacent samples having the largest total magnitude, referred to as the three-sample peak. In the case of FIG. 9, both the single-sample peak and three-sample peak would be the frequency represented by the sample designated 235.

Frequency averaging could also be performed in the determination of the Doppler frequency. For example, an average, weighted by sample magnitude, of all samples within a predetermined sample range of the peak could be generated. The predetermined range could include all samples having a relative minimum amplitude with respect to the magnitude of the peak sample. Thus, as shown in FIG. 9, the average Doppler frequency might be determined by computing a weighted average of the five samples designated 231–239. Alternatively, the range could be limited to signals having magnitudes greater than a given amount, such as six dB above the noise level.

In addition to the foregoing, a high-pass filter might be used to cancel low frequency hump noise generally in accordance with the teachings of U.S. Pat. No. 4,993,418 to Weaver, et al., the disclosure of which is incorporated herein by reference. Many other ways of determining the Doppler frequency could be used.

After the Doppler frequency is determined, the flow is determined based thereon. The flow may be an instantaneous flow or an average flow determined from a number of instantaneous flows taken over a predetermined period of time. Each instantaneous flow is determined in a conventional manner based upon the frequency-to-flow characteristics of the particular transmit and receive probes 30a, 40a that are used in the flowmeter 10. For example, a probe might have a constant frequency-to-flow characteristic or a nonconstant, but linear, frequency-to-flow characteristic.

The average flow over a period of time may be determined based upon a number of instantaneous flow values. One purpose of generating an average flow is to generate a visual display of the flow that changes relatively smoothly without quickly jumping around between different flow values. The average could be determined by simply averaging a predetermined number, such as 20, of successive instantaneous flow values. Alternatively, a predetermined number of instantaneous flow values could be initially averaged, and then the average could be refined by only averaging the flow values within a predetermined limit of the initial average, such as the flow values within two standard deviations of the initial average. This latter approach would tend to filter spurious instantaneous flow values from a tight grouping of flow values (representing steady flow) while including all instantaneous flow values in a loose grouping (representing changing flow).

Other minor refinements could be utilized. For example, if more than half of the instantaneous flow samples are zero, than the average flow could be set to zero. In addition, the average flow could be rounded to the nearest 0.05 liter-per-minute (LPM) if the average flow is less than 1.5 LPM or to the nearest 0.1 LPM if the average flow is greater than 1.5 LPM.

Numerous modifications and alternative embodiments will be apparent to those skilled in the art in view of the foregoing description. This description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A medical device, comprising:
    a multi-frequency transmitter, adapted to be coupled to a conduit through which liquid constituents may flow, for transmitting a plurality of transmitted signals including a first signal transmitted into said conduit at a first frequency during a first period of time and a second signal transmitted into said conduit at a second frequency during a second period of time, said second frequency being substantially different than said first frequency by a transmission frequency difference;
    a receiver for receiving a plurality of received signals including a first signal received during said first period of time and a second signal received during said second period of time, at least one of said received signals being a reflection, from said liquid constituents, of one of said transmitted signals, said first received signal having a third frequency and said second received signal having a fourth frequency;
    means for generating a plurality of difference signals including a first difference signal based upon a first frequency difference between said first and third frequencies and a second difference signal based upon a second frequency difference between said second and fourth frequencies;
    means for determining whether said first frequency difference substantially differs from said second frequency difference; and
    means for generating a flow signal based upon one of said difference signals.

2. A medical device as defined in claim 1 wherein said flow-signal generating means comprises means for generating a flow signal based only upon said difference signals which have a frequency difference substantially equal to said transmission frequency difference.

3. A medical device as defined in claim 1 additionally comprising means for cancelling said first difference signal if said first frequency difference substantially differs from said second frequency difference.

4. A medical device as defined in claim 1 wherein said means for determining whether said first frequency difference substantially differs from said second frequency difference comprises:

means for generating a first set of frequency-domain samples from said first transmitted signal and said first received signal and a second set of frequency-domain samples from said second transmitted signal and said second received signal; and means for comparing a first sample from said first set with a second sample from said second set, said first and second samples having a frequency offset substantially equal to said transmission frequency difference.

5. A medical device as defined in claim 4 wherein said first sample has a first magnitude, wherein said second sample has a second magnitude, and wherein said comparing means comprises means for comparing said first and second magnitudes to a threshold magnitude.

6. A medical device as defined in claim 5 additionally comprising means for cancelling said first and second samples if said first and second samples surpass said threshold magnitude.

7. A medical device as defined in claim 1 wherein one of said difference signals has a magnitude, additionally comprising means for increasing said magnitude of one of said difference signals if said first frequency difference is substantially equal to said second frequency difference.

8. A medical device as defined in claim 7 wherein said means for determining whether said first frequency difference substantially differs from said second frequency difference comprises means for generating a first set of frequency-domain samples from said first transmitted signal and said first received signal and a second set of frequency-domain samples from said second transmitted signal and said second received signal and wherein said magnitude-increasing means comprises means for summing said frequency-domain samples in said first and second sets.

9. A medical device as defined in claim 8 wherein said means for determining whether said first frequency difference substantially differs from said second frequency difference additionally comprises means for comparing a first sample from said first set of frequency-domain samples with a second sample from said second set of frequency-domain samples, said first and second samples having a frequency offset substantially equal to said transmission frequency difference.

10. A medical device as defined in claim 1 wherein said transmitted signals comprise ultrasonic signals and wherein said transmitter comprises:

circuit means for generating variable-frequency electrical signals; and a transmit probe coupled to said circuit means which converts said electrical signals into ultrasonic signals.

11. A medical device, comprising:

multi-frequency transmitter means for transmitting a plurality of transmitted signals, including a first signal transmitted at a first frequency during a first period of time and a second signal transmitted at a second frequency during a second period of time, said second frequency being substantially different than said first frequency by a transmission frequency difference;

receiver means for receiving a plurality of received signals including a first signal received at a third frequency during said first period of time and a second signal received at a fourth frequency during said second period of time, at least one of said received signals being derived from one of said transmitted signals;

means for detecting the presence of electrical interference by detecting that one of said received signals has a frequency which is independent of said first and second transmission frequencies.

12. A medical device as defined in claim 11 wherein said detecting means comprises means for detecting the presence of electrical interference by determining that one of said received signals of a threshold magnitude has a first difference frequency and another of said received signals of a threshold magnitude has a second difference frequency which differs from said first difference frequency by an amount substantially equal to said transmission frequency difference.

13. A medical device as defined in claim 11 wherein said detecting means comprises:

means for generating a plurality of difference signals including a first difference signal based upon a first frequency difference between said first and third frequencies and a second difference signal based upon a second frequency difference between said second and fourth frequencies; and means for determining whether said first frequency difference substantially differs from said second frequency difference.

14. A medical device as defined in claim 13 additionally comprising means for generating a flow signal based upon one of said difference signals.

15. A medical device as defined in claim 14 wherein said flow-signal generating means comprises means for generating a flow signal based only upon said difference signals which have a frequency difference substantially equal to said transmission frequency difference.

16. A medical device as defined in claim 13 additionally comprising means for cancelling said first difference signal if said first frequency difference substantially differs from said second frequency difference.

17. A medical device as defined in claim 13 wherein said means for determining whether said first frequency difference substantially differs from said second frequency difference comprises:

means for generating a first set of frequency-domain samples from said first transmitted signal and said first received signal and a second set of frequency-domain samples from said second transmitted signal and said second received signal; and means for comparing a first sample from said first set with a second sample from said second set, said first and second samples having a frequency offset substantially equal to said transmission frequency difference.

18. A medical device as defined in claim 17 wherein said first sample has a first magnitude, wherein said second sample has a second magnitude, and wherein said comparing means comprises means for comparing said first and second magnitudes to a threshold magnitude.

19. A medical device as defined in claim 18 additionally comprising means for cancelling said first and second samples if said first and second samples surpass said threshold magnitude.

20. A medical device as defined in claim 13 wherein one of said difference signals has a magnitude, additionally comprising means for increasing said magnitude of one of said difference signals when said first frequency difference is substantially equal to said second frequency difference.

21. A medical device as defined in claim 20 wherein said means for determining whether said first frequency difference substantially differs from said second frequency difference comprises means for generating a first set of frequency-domain samples from said first transmitted signal and said first received signal and a second set of frequency-domain samples from said second transmitted signal and said second received signal and wherein said magnitude-increasing means comprises means for summing said frequency-domain samples in said sets.

22. A medical device as defined in claim 21 wherein said means for determining whether said first frequency difference substantially differs from said second frequency difference additionally comprises means for comparing a first sample from said first set of frequency-domain samples with a second sample from said second set of frequency-domain samples, said first and second samples having a frequency offset substantially equal to said transmission frequency difference.

23. A medical device as defined in claim 11 wherein said transmitted signals comprise ultrasonic signals and wherein said transmitter means comprises:

circuit means for generating variable-frequency electrical signals; and a transmit probe coupled to said circuit means which converts said electrical signals into ultrasonic signals.

24. A medical device as defined in claim 11 wherein said electrical interference comprises Bovie interference generated by an electro-surgical unit.

25. A method comprising the steps of:
(a) transmitting a plurality of transmitted signals, including a first transmitted signal having a first frequency;
(b) receiving a plurality of received signals, including a first signal received while said first transmitted signal is being transmitted, at least one of said received signals being derived from one of said transmitted signals and having a second frequency;
(c) transmitting a second transmitted signal having a third frequency substantially different than said first frequency;
(d) while said step (c) is being performed, receiving a second received signal having a fourth frequency; and
(e) detecting the presence of electrical interference by detecting that one of said received signals has a frequency which is independent of one of said first and second frequencies, said step (e) comprising the steps of:
(e1) determining a first frequency difference between said first and second frequencies:
(e2) determining a second frequency difference between said third and fourth frequencies; and
(e3) determining whether said first frequency difference is substantially different than said second frequency difference.

26. A method comprising the steps of:
(a) transmitting a plurality of transmitted signals, including a first transmitted signal having a first frequency;
(b) receiving a plurality of received signals, including a first signal received while said first transmitted signal is being transmitted, at least one of said received signals being derived from one of said transmitted signals;
(c) transmitting a second transmitting signal having a second frequency substantially different than said first frequency;
(d) while said step (c) is being performed, receiving a second received signal; and
(e) detecting the presence of electrical interference by detecting that one of said received signals has a frequency which is independent of one of said first and second frequencies, wherein said step (e) comprises the steps of:
(e1) generating a first set of frequency-domain samples from said first transmitted signal and said first received signal;
(e2) generating a second set of frequency-domain samples from said second transmitted signal and said second received signal;
(e3) comparing one of said samples from said first set with one of said samples from said second set; and
(e4) repeating said step (e3) for a plurality of said samples.

27. A method as defined in claim 26 wherein said step (e3) comprises the step of comparing a first sample from said first set with a second sample from said second set, said first and second samples having a frequency offset substantially equal to said transmission frequency.

28. A method comprising the steps of:
(a) transmitting a plurality of transmitted signals, including a first transmitted signal having a first frequency;
(b) receiving a plurality of received signals, including a first signal received while said first transmitted signal is being transmitted, at least one of said received signals being derived from one of said transmitted signals;
(c) transmitting a second transmitted signal having a second frequency substantially different than said first frequency;
(d) while said step (c) is being performed, receiving a second received signal; and
(e) detecting the presence of electrical interference by detecting that one of said received signals has a frequency which is independent of one of said first and second frequencies, wherein said step (e) comprises the steps of (e1) generating a first set of frequency-domain samples from said first transmitted signal and said first received signal and (e2) generating a second set of frequency-domain samples from said second transmitted signal and said second received signal, said method additionally comprising the step of (f) summing said samples of said first set with said samples of said second set.

* * * * *